United States Patent
Adcock et al.

(10) Patent No.: US 9,606,527 B2
(45) Date of Patent: Mar. 28, 2017

(54) AUTOMATED FABRICATION SYSTEM IMPLEMENTING 3-D VOID MODELING

(71) Applicant: Caterpillar Inc., Peoria, IL (US)

(72) Inventors: Leon Robert Adcock, Chillicothe, IL (US); Donald Albert Stickel, III, Chillicothe, IL (US); Huijun Wang, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 257 days.

(21) Appl. No.: 14/319,575

(22) Filed: Jun. 30, 2014

(65) Prior Publication Data
US 2015/0375344 A1 Dec. 31, 2015

(51) Int. Cl.
*B23K 28/02* (2014.01)
*B23K 9/095* (2006.01)
(Continued)

(52) U.S. Cl.
CPC ............ *G05B 19/402* (2013.01); *B23K 9/127* (2013.01); *B29C 67/0055* (2013.01); *B29C 70/745* (2013.01); *B29C 70/84* (2013.01); *B33Y 10/00* (2014.12); *B33Y 30/00* (2014.12); *B33Y 50/02* (2014.12); *F16B 5/08* (2013.01);
(Continued)

(58) Field of Classification Search
CPC ........ G05B 19/402; G05B 2219/45104; G05B 2219/40032; F16B 11/006; F16B 5/08; B23K 9/127; B29C 70/745; B29C 70/84; B29C 67/0055; Y10S 901/42; B33Y 30/00; B33Y 50/02; B33Y 10/00
See application file for complete search history.

(56) References Cited

U.S. PATENT DOCUMENTS 4,095,077 A * 6/1978 Schneider ............... B23K 9/10
219/125.12
4,532,404 A * 7/1985 Boillot ................ B23K 9/0956
219/124.34
(Continued)

FOREIGN PATENT DOCUMENTS

JP          2007-237220     9/2007
WO       PCT/WO01/30532    5/2001
WO       WO 2014/006094    1/2014

OTHER PUBLICATIONS

Anzalone, Gerald C. et al., entitled "A Low-Cost Open-Source Metal 3-D Printer", IEEE Access, vol. 1 (Nov. 5, 2013).
(Continued)

*Primary Examiner* — Ramesh Patel

(57) ABSTRACT

A fabrication system is disclosed for use in joining two components of a work piece. The fabrication system may have a mount configured to hold the work piece with a void to be filled with material. The fabrication system may also have a scanner configured to capture at least one image of the void, a robotic fabrication device movable relative to the mount, and a controller in communication with the scanner and the robotic fabrication device. The controller may be configured to generate a model of the void based on the at least one image, and to slice the model into at least one layer. The controller may also be configured to develop a tool path for each of the at least one layer, and to cause the robotic fabrication device to deposit material within the void based on the tool path.

19 Claims, 3 Drawing Sheets

(51) Int. Cl.
- *G05B 19/402* (2006.01)
- *B23K 9/04* (2006.01)
- *B29C 70/74* (2006.01)
- *B29C 70/84* (2006.01)
- *B29C 67/00* (2017.01)
- *B23K 9/127* (2006.01)
- *B33Y 10/00* (2015.01)
- *B33Y 30/00* (2015.01)
- *B33Y 50/02* (2015.01)
- *F16B 5/08* (2006.01)

(52) U.S. Cl.
CPC .............. *G05B 2219/40032* (2013.01); *G05B 2219/45104* (2013.01); *Y10S 901/42* (2013.01)

(56) References Cited

U.S. PATENT DOCUMENTS

| | | | |
|---|---|---|---|
| 5,207,371 A * | 5/1993 | Prinz | B22F 3/008 164/46 |
| 5,239,739 A * | 8/1993 | Akeel | B23K 37/047 29/430 |
| 5,301,863 A * | 4/1994 | Prinz | B22F 3/008 156/59 |
| 6,163,946 A * | 12/2000 | Pryor | A01B 69/008 29/407.04 |
| 6,405,095 B1 * | 6/2002 | Jang | B29C 67/0081 264/308 |
| 6,457,629 B1 * | 10/2002 | White | B23K 20/10 228/112.1 |
| 6,676,892 B2 * | 1/2004 | Das | B22F 3/1055 419/7 |
| 6,802,122 B2 * | 10/2004 | Milburn | B23K 9/044 219/76.1 |
| 6,814,823 B1 * | 11/2004 | White | B23K 11/0013 156/73.1 |
| 7,003,864 B2 * | 2/2006 | Dirscherl | B22F 3/008 219/121.26 |
| 7,962,237 B2 | 6/2011 | Kritchman | |
| 8,525,830 B2 | 9/2013 | Davies et al. | |
| 8,546,717 B2 * | 10/2013 | Stecker | B22F 3/1055 219/121.13 |
| 2004/0128016 A1 * | 7/2004 | Stewart | G05B 19/4099 700/159 |
| 2006/0049153 A1 * | 3/2006 | Cahoon | B23K 26/03 219/121.63 |
| 2012/0072001 A1 | 3/2012 | Knighton | |
| 2013/0197683 A1 | 8/2013 | Zhang et al. | |
| 2013/0314504 A1 | 11/2013 | Zenzinger et al. | |

OTHER PUBLICATIONS

Hewitt, John, entitled "3D Printing with Metal: The Final Frontier of Additive Manufacturing", http://www.extremetech.com/extreme/143552-3d-printing-with-metal-the-final-frontier-of-additive-manufacturing (Dec. 27, 2012).

Hobson, James, entitled "3D Printing Metal Structures with a 6-axis Robot" (Feb. 24, 2012).

"Sigma Labs & Michigan Tech to Develop Low Cost 3D Metal Printer" (Dec. 23, 2013) www.3ders.org.

* cited by examiner

AUTOMATED FABRICATION SYSTEM IMPLEMENTING 3-D VOID MODELING

TECHNICAL FIELD

The present disclosure relates to a fabrication system and, more particularly, to an automated fabrication system that implements 3-D void modeling.

BACKGROUND

Welding is a fabrication process used to join together two components of similar material through the application of heat and a filler material. Welding can be done manually or autonomously via a welding robot. Manual welding can be inconsistent in both quality and appearance. This can be especially true when the seam is welded by different technicians.

When welding a seam using a robot welder, the robot is generally pre-programmed to execute the same sequence of movements at the same locations and with the same welding parameters (e.g., speed, power, feed rate, etc.) each time the robot is presented with the two components. In this way, a very repeatable weld may be created. However, even though the same type of components can be repeatedly welded by the same robot, each component may be slightly different due to manufacturing tolerances, and/or presented to the robot in a slightly different manner (e.g., position and/or orientation). As a result, the void between the components that is to be filled with molten material may not always be the same shape and size. Yet the robot welder may still execute the same weld sequence. Accordingly, each weld may turn out different and, in some situations, the resulting weld may not have the quality and/or appearance required for a particular application.

An exemplary welding method is disclosed in U.S. Patent Application Publication 2013/0197683 of Zhang et al. that published on Aug. 1, 2013 ("the '683 publication"). In particular, the '683 publication discloses a method for manufacturing a part in layers. The method includes slicing a 3-D model of the part into layers, the number of layers depending on a required dimensional accuracy of the part. The method also includes planning a modeling path according to slicing data of the 3-D model, and generating numerical control codes for model processing. The method further includes performing fused deposition modeling of wire material onto a substrate layer using a welding gun according to a track specified by the numerical control code for each layer.

Although the method of the '683 publication may allow for creation of an irregular 3-D object through welding, the '683 publication does not disclose origination of the corresponding model. In addition, while the method may be capable of producing a part, it may lack the necessary control to join two components together. Further, the '683 publication may only be capable of material deposition, which may limit broad applicability.

The present disclosure is directed to overcoming one or more of the shortcomings set forth above and/or other problems of the prior art.

SUMMARY

In one aspect, the present disclosure is directed to an automated fabrication system. The automated fabrication system may include a mount configured to hold a work piece with a void to be filled with material. The fabrication system may also include a scanner configured to capture at least one image of the void, a robotic fabrication device movable relative to the mount, and a controller in communication with the scanner and the robotic fabrication device. The controller may be configured to generate a model of the void based on the at least one image, and to slice the model into at least one layer. The controller may also be configured to develop a tool path for each of the at least one layer, and to cause the robotic fabrication device to deposit material within the void based on the tool path.

In a second aspect, the present disclosure is directed to another automated fabrication system. This system may include a mount configured to hold a work piece, and a scanner configured to capture at least one image of the work piece. The system may also include a robotic fabrication device movable relative to the mount, and a controller in communication with the scanner and the robotic fabrication device. The controller may be configured to generate a model of the work piece based on the at least one image, and to slice the model into at least one layer. The controller may further be configured to develop a tool path for each of the at least one layer, and to cause the robotic fabrication device to perform a fabrication process based on the tool path.

In a third aspect, the present disclosure is directed to a method of fabricating a work piece. The method may include capturing at least one image of a void in the work piece, and generating a model of the void based on the at least one image. The method may also include slicing the model into at least one layer, developing a tool path for each of the at least one layer, and automatically depositing material into the void based on the tool path.

DETAILED DESCRIPTION

Figure 1:
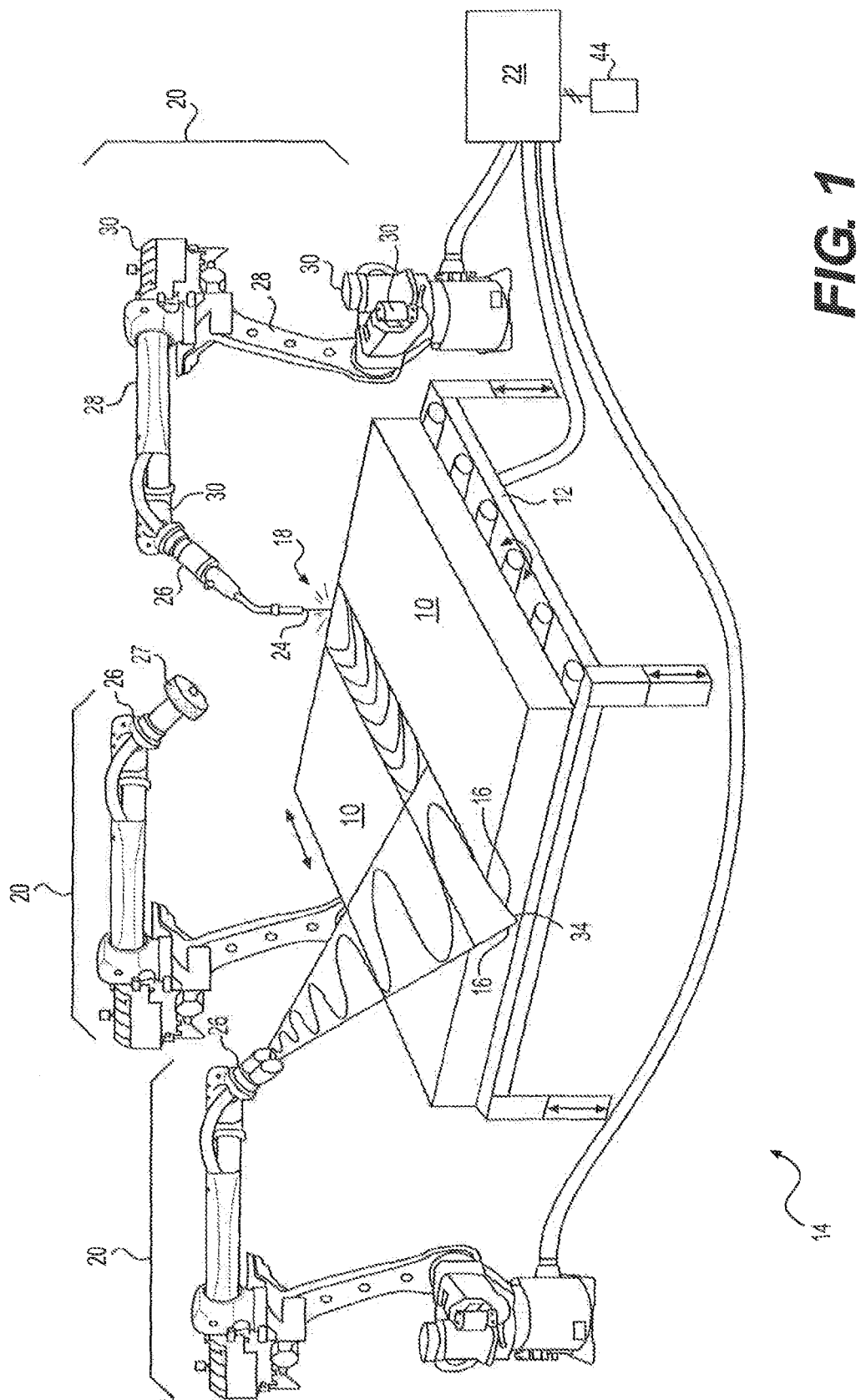
FIG. 1 is a diagrammatic illustration of an exemplary disclosed fabrication system.

FIG. 1 illustrates two components 10 that are held within a mount 12 during processing by a fabrication system 14. In the disclosed embodiment, both components 10 are generally planer and held flat against mount 12, with beveled edges 16 of components 10 brought near each other at a seam 18. Components 10 may be joined to each other to form an integral work piece. It is contemplated that components 10 used to fabricate the work piece may have any shape and be oriented in any manner (e.g., perpendicular to each other), as desired. It is further contemplated that one or more of edges 16 may have a shape other than beveled, such as a blunt shape, a dual beveled edge, etc., and/or that the adjacent edges 16 of seam 18 may be integral to the same component 10.

As used herein, the term "work piece" is intended to cover an objected having undergone or intended to undergo a fabrication process. In the disclosed embodiments, multiple components 10 are joined together during the fabrication process to form the work piece. However, in other embodiments, the work piece may begin as a single component and have fabrication processes performed thereon to add or remove material from the work piece.

Mount 12 may be configured to hold components 10 generally stationary relative to each other, and either hold components 10 stationary or move components 10 relative to fabrication system 14 during a fabrication (e.g., material deposition and/or removal) process. For example, mount 12 may be equipped with one or more actuators (not shown) that are configured to linearly move components 10 in a length wise direction of seam 18, move components 10 in a transverse direction, raise/lower components 10, and/or tilt components 10 toward and/or away from fabrication system 14.

Fabrication system 14 may include mechanisms that cooperate to autonomously fill seam 18 with material and join edges 16 to each other, or to remove material from components 10 (e.g., to prepare seam 18 for filling and/or to finish seam 18 after filling). For example, fabrication system 14 may include, among other things, one or more robotic fabrication devices (RFD) 20, and a controller 22 configured to regulate movements of each RFD 20.

RFD 20 may have any number of processing heads 26, one or more arms 28 operatively connected to each head 26, and a plurality of actuators 30 configured to move arms 28 and/or heads 26 during a fabrication process in response to commands from controller 22. In a first example, the fabrication process is a deposition process such as welding, and head 26 is configured to feed or otherwise advance a metal rod or wire 24 toward seam 18 while simultaneously directing current through rod 24. In a second example, the fabrication process is a removal process such as grinding or cutting, and head 26 is configured to power a removal tool (e.g., to rotate a grinding wheel 27 or to energize a plasma arc cutter). In a third example, the fabrication process is a scanning process such as image capturing, and head 26 includes a scanning device such as a camera 29 or an RF scanner. It is contemplated that a single head 26 could be configured to perform all three processes, that RFD 20 may have three different heads 26 that are independently operable (shown in FIG. 2), and/or that RFD 20 may have three heads 26 that are separately attachable one-at-a-time to a single set of arms 28. Other configurations may also be possible.

Controller 22 may control operations of fabrication system 14 in response to the image captured by the scanning head 26 and/or one or more sets of instructions contained within memory. Specifically, in response to image signals received from the scanning device of RFD 20, controller 22 may generate a 3-D model 32 (shown in FIG. 3) of a void 34 (shown in FIG. 2) formed at seam 18 by the space between beveled edges 16. Controller 22 may then slice the 3-D model 32 into layers (e.g., in a first layer 36, a second layer 38, and a third layer 40), and generate tool paths 42 that should be followed by the deposition and/or removal heads 26 of RFD 20. Controller 22 may then selectively adjust power sent to and/or operation of heads based on the tool paths 42. It is contemplated that controller 22 may also communicate with actuators 30 of mount 12 and be configured to selectively move components 10 relative to heads 26 based on input from RFD 20 and/or the instructions stored in memory, if desired.

Controller 22 may embody a single microprocessor or multiple microprocessors that include a means for controlling an operation of fabrication system 14. Numerous commercially available microprocessors may perform the functions of controller 22. Controller 22 may include or be associated with a memory for storing data such as, for example, an operating condition, design limits, performance characteristics or specifications of fabrication system 14 and components 10, and/or operational instructions. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of fabrication system 14 via either wired or wireless transmission and, as such, controller 22 may be disposed in a location remote from fabrication system 14, if desired.

In some embodiments, controller 22 may rely on feedback during a fabrication process (deposition and/or removal process) to affect the process. For example, controller 22 may rely on sensory feedback, such as temperature feedback from a sensor 44 (e.g., an infra-red thermal sensor—referring to FIG. 1), to help ensure that the process is proceeding as expected. In some deposition applications, it may be possible for a temperature induced within components 10 to exceed a threshold level at which characteristics (e.g., brittleness, hardness, warping, etc.) of the resulting work piece deviate from desired characteristics. In these applications, controller 22 may be configured to adjust a feed rate, a travel rate, a power level, a depth, a cooling delay, etc., based on the feedback.

Controller 22 may be configured to cause heads 26 to fill seam 18 with weld material and/or to remove material at seam 18 (e.g., in preparation for filling and/or after filling to finish seam 18) according to one or more algorithms stored in memory. Different steps of these algorithms are visually depicted in FIGS. 2 and 3, and shown in the flowchart of FIG. 4. These figures will be discussed in more detail in the following section to further illustrate the disclosed concepts.

INDUSTRIAL APPLICABILITY

The disclosed fabrication system may be used to join components in a manner that produces a quality work piece, even when the components are irregular and/or arranged in an unintended manner. In particular, the disclosed fabrication system may be configured to take into account the irregularity of the components and/or the unintended arrangement of the components through modeling, create tool paths based on the modeling, and automatically deposit or remove material by following the tool paths. The result may be improved weld saturation, improved joint strength, and improved appearance. Operation of fabrication system 14 will now be described in detail with respect to FIGS. 2-4.

Figure 2:
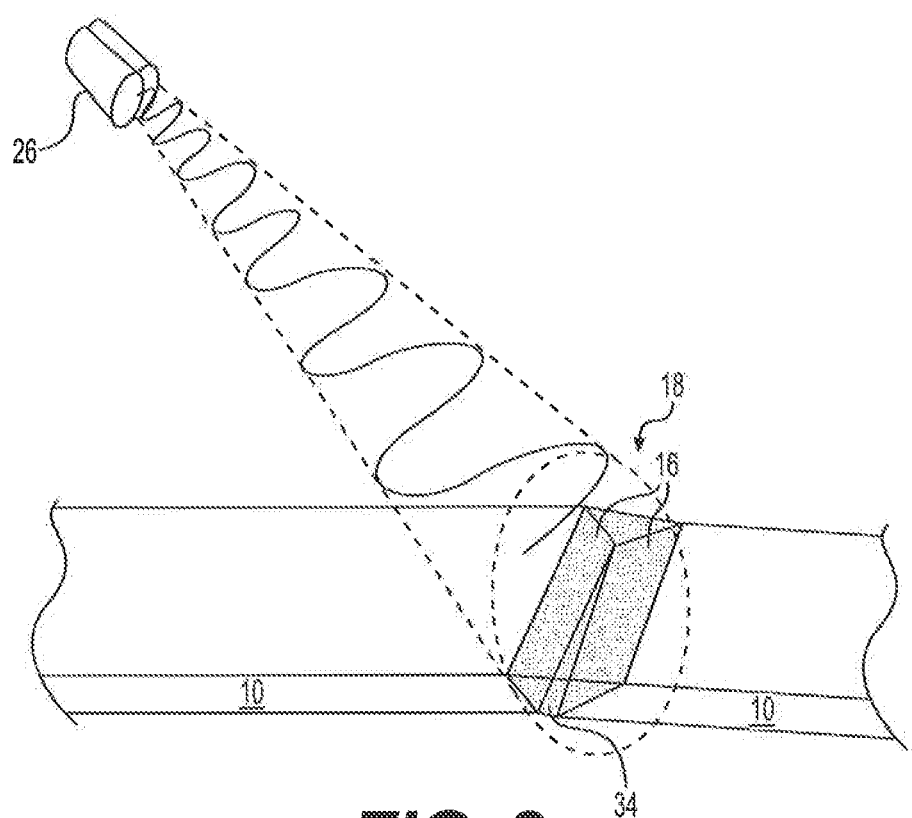
FIG. 2 is an isometric illustration of components being joined by the fabrication system of FIG. 1.

Operation of fabrication system 14 can generally be divided into three different phases, including a preparation phase, a fabrication phase, and a finishing phase. At start of the preparation phase (Step 400—referring to FIG. 4), controller 22 may gather information regarding components 10 to be welded. This information may include one or more scanned images of the space between edges 16. As shown in FIG. 2, the scanning head 26 may capture the images of seam 18 that are used to create the model 32 of void 34 (Step 410). As components 10 may each be slightly different (even when components 10 have the same part numbers) and arranged in a slightly different manner (even when robotically positioned or positioned using jigs), the space between edges 16 will always have a slightly different size, shape, and volume. And if the same fabrication sequence was used to fill the different spaces, the resulting joints could be different and, in some instances, have undesired characteristics. The images captured by the scanning head 26 may include and help account for these differences.

Figure 3:
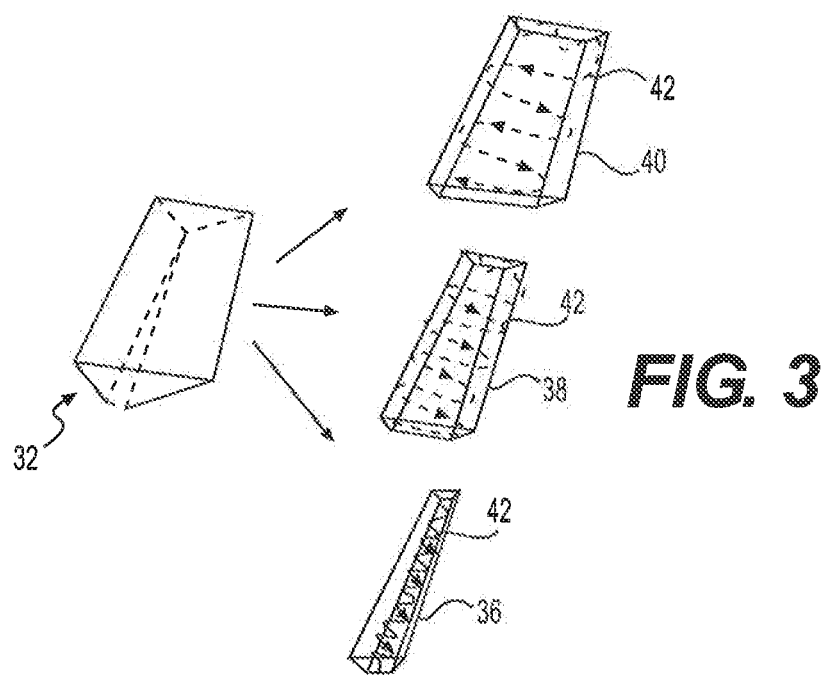
FIG. 3 is a diagrammatic illustrations of exemplary steps performed by the fabrication system of FIG. 1.

As shown in FIG. 3, controller 22 may use the images captured by the scanning head 26 to create a unique 3-D model 32 associated with each pairing of components 10

(Step 420). The 3-D model 32 may represent void 34 located at seam 18 that should be filled with material to complete the joining of components 10. Model 32 may be created using methods known in the art.

As also shown in FIG. 3, controller 22 may then be configured to slice model 32 into multiple layers 36-40 (Step 430). In the disclosed embodiment, each of these layers may have a thickness about equal to a thickness of material that can be deposited by head 26 in a single pass. In other words, the deposition head 26 may be configured to deposit material in a bead formation (i.e., an elongated formation having a circular or elliptical cross-section), and the thickness of layers 36-40 may be about the same as a diameter of the bead formation. In another embodiment, the thickness of layers 36-40 may be a multiple of the bead diameter, and require multiple passes for a sufficient amount of the material to be deposited.

Controller 22 may then be configured to determine one or more tool paths 42 for each layer 36-40 that head 26 should follow during the fabrication phase, and corresponding control parameters (Step 440). In some embodiments, tool path 42 may include a preliminary segment that should be followed by a material removal head 26 in preparation for subsequent material deposition segments. In particular, it may be possible that portions of components 10 (e.g., portions of edges 16) need to be removed (e.g., flattened, polished, recessed, straightened, etc.) and/or shaped (e.g., corners rounded and/or dams built) in order to properly receive fill material. In other embodiments, the tool paths 42 may be associated with only material deposition. In either embodiment, tool paths 42 should allow for the total volume of each layer 36-40 of model 32 to be completely filled before fabrication of the adjacent layer begins. Each tool path 42 may be generated based on a size, shape, and/or volume of void 34 and the corresponding layer 36-40, and deposition characteristics of head 26. The deposition characteristics may include, among other things, a deposition feed rate, a deposition cross-sectional area, and a thermal loading imparted to the work piece by the deposition. In addition, each controller 22 may determine control parameters for head 26 corresponding to each segment of the tool path 42 based on characteristics of the deposition head 26, the material being deposited, and/or the material of components 10. For example, a thickness and a trajectory of travel path 42 (e.g., length, direction, location, and/or turn radius) may vary for different components and/or different deposition heads 26. In addition, a wire feed rate, a head travel speed, a current, and other control parameters may also vary based on component and/or head characteristics. Controller 22 may then follow one or more different algorithms stored in memory to fill seam 18 with weld material and complete the fabrication phase (Step 450).

In some embodiments, feedback from sensor 44 may affect completion of the fabrication phase. In particular, as head 26 is removing material from and/or depositing material into seam 18, sensor 44 may provide feedback regarding the process. In one example, the feedback includes a signal indicative of a temperature of either of components 10 and/or of the deposited material. This signal may then be used by controller 22 to adjust the operation (e.g., to adjust the feed rate, travel rate, thickness, cooling delays, and/or current).

After the fabrication phase is complete, controller 22 may cause the scanning head 26 to generate additional images of seam 18 during the finishing phase (Step 460), which may provide an indication as to a quality of seam 18. Controller 22 may again be configured to use the images provided by the scanning head 26 to generate a new 3-D model of void 34 within seam 18 (Step 470), and to compare the new model to a desired model of void 34 and/or to the initial model 32 that was generated before void 34 was filled (Step 480). And based on this comparison, controller 22 may determine if void 34 has been adequately filled with deposited material and not overfilled. If void 34 is determined to be adequately filled, the process may end (Step 490:Yes).

However, if at step 480, controller 22 determines that some space is left unfilled within void 34 (e.g., an amount greater than a threshold amount and/or an amount at a critical area of seam 18—Step 480:No), control may return to step 430. That is, controller 22 may cause additional material to be deposited at seam 18 or, if too much material was deposited at seam 18 (i.e., such that the material overflowed seam 18), controller 22 may cause material to be removed.

In some embodiments, controller 22 may also use the second 3-D model for calibration purposes. In particular, if the second model does not substantially match the desired model of void 34, controller 22 may conclude that the factors used to slice layers 36-40 and/or to determine travel paths 42 require adjustment. Controller 22 may iteratively and/or periodically make adjustments to these factors until the second model substantially matches the desired model.

Figure 4:
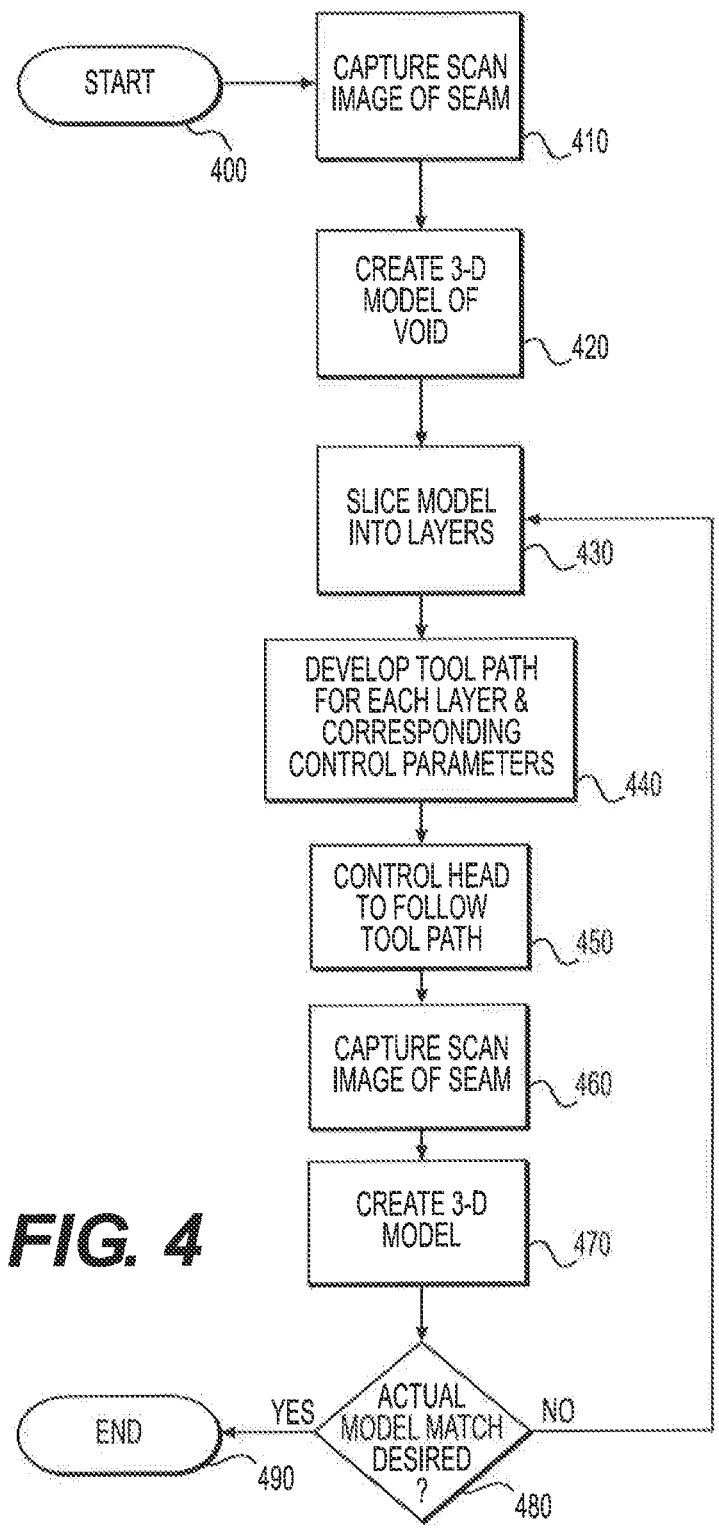
FIG. 4 is a flowchart depicting the steps illustrated in FIG. 3.

It is contemplated that the disclosed fabrication system may be configured to perform a process similar to that disclosed in FIG. 4, but that involves only or primarily material removal, if desired. For example, controller 22 may be configured to use images captured by the scanning head 26 of a protrusion (as opposed to a void) on component 10. Controller 22 may then generate the 3-D model 32 of the protrusion based on the images, and slice model 32 into layers 36-40. Controller 22 may then generate tool paths 42 for each layer that can be used by the removal head 26 to grind or cut away the protrusion from component 10.

The disclosed fabrication system may produce high quality work pieces in a time efficient manner. Specifically, because the disclosed system may generate 3-D models that are unique to each pairing and arrangement of components 10, the ensuing fabrication process that is controlled based on the unique model may be of high quality. And the ability to assess the process at its completion and to selectively improve the process based on the assessment may help to improve the process at each iteration. Further, the disclosed process may be applicable to both material deposition and material removal.

It will be apparent to those skilled in the art that various modifications and variations can be made to the disclosed fabrication system. Other embodiments will be apparent to those skilled in the art from consideration of the specification and practice of the disclosed fabrication system. It is intended that the specification and examples be considered as exemplary only, with a true scope being indicated by the following claims and their equivalents.

What is claimed is:

1. A fabrication system, comprising:
 a mount configured to hold a work piece having a void to be filled with material;
 a scanner configured to capture at least one image of the void;
 a robotic fabrication device movable relative to the mount; and
 a controller in communication with the scanner and the robotic fabrication device and configured to:

generate a 3-D model of the void based on the at least one image during a preparation phase prior to a deposition of material within the void during a fabrication phase;

slice the 3-D model into a plurality of layers during the preparation phase;

develop a tool path to be followed by the robotic fabrication device during the fabrication phase for each of the plurality of layers, wherein the tool path to be followed by the robotic fabrication device for each of the plurality of layers is developed during the preparation phase prior to the fabrication phase; and cause the robotic fabrication device to deposit material within the void during the fabrication phase based on the tool path developed during the preparation phase prior to the deposition of material within the void.

2. The fabrication system of claim 1, wherein:
the robotic fabrication device is a welder configured to deposit the material in a bead formation; and
each of the plurality of layers has a thickness about equal to a diameter of the bead formation.

3. The fabrication system of claim 1, wherein the controller is configured to develop the tool path based at least in part on a shape of the void, a volume of the void, and one or more characteristics associated with the robotic fabrication device.

4. The fabrication system of claim 3, wherein the characteristics associated with the robotic fabrication device include a deposition feed rate, a deposition cross-sectional area, and a thermal loading.

5. The fabrication system of claim 1, wherein:
the at least one image includes at least a first image; and
the controller is further configured to cause the scanner to capture at least a second image after deposition of material by the robotic fabrication device, the at least a second image providing an indication of a quality of the deposition.

6. The fabrication system of claim 5, wherein:
the 3-D model is a first 3-D model;
the tool path is a first tool path for each of the plurality of layers; and
the controller is further configured to:
generate a second 3-D model based on the at least a second image;
make a comparison of the second 3-D model to a desired model; and
selectively develop a second tool path based on the comparison.

7. The fabrication system of claim 6, wherein the robotic fabrication device is further configured to remove material.

8. The fabrication system of claim 7, wherein the controller is further configured to selectively cause the robotic fabrication device to remove material from the work piece prior to deposition of material based on the first 3-D model.

9. The fabrication system of claim 8, wherein the controller is further configured to selectively cause the robotic fabrication device to remove or deposit material based on the second 3-D model during completion of the second tool path.

10. The fabrication system of claim 6, wherein the controller is configured to selectively implement a calibration procedure based on the comparison.

11. The fabrication system of claim 1, further including a thermal sensor configured to generate a signal indicative of a temperature of the work piece during deposition of material by the robotic fabrication device, wherein the controller is in further communication with the thermal sensor and configured to selectively adjust the tool path based on the signal.

12. A fabrication system, comprising:
a mount configured to hold a work piece;
a scanner configured to capture at least one image of the work piece;
a robotic fabrication device movable relative to the mount; and
a controller in communication with the scanner and the robotic fabrication device and configured to:
generate a model of the work piece based on the at least one image during a preparation phase prior to the performance of a fabrication process;
slice the model into at least one layer during the preparation phase prior to the performance of a fabrication process;
develop a tool path for each of the at least one layer during the preparation phase prior to the performance of a fabrication process; and
cause the robotic fabrication device to perform the fabrication process during a fabrication phase based on the tool path developed during the preparation phase prior to the performance of a fabrication process.

13. The fabrication system of claim 12, wherein the fabrication process includes a deposition process and a removal process, and the robotic fabrication device includes one or more processing heads, the one or more processing heads including a processing head configured to advance a metal rod toward the work piece while directing current through the rod during the deposition process and a processing head configured to power a grinding wheel during the removal process.

14. A method of fabricating a work piece, comprising:
capturing at least one image of a void in the work piece during a preparation phase, wherein the preparation phase is prior to a deposition of material into the void;
generating a model of the void based on the at least one image during the preparation phase;
slicing the model into at least one layer during the preparation phase;
developing a tool path for each of the at least one layer during the preparation phase; and
automatically depositing material into the void during a fabrication phase based on the tool path generated during the preparation phase prior to the deposition of material into the void.

15. The method of claim 14, wherein the model is a 3-D model.

16. The method of claim 14, wherein:
the at least one layer includes a plurality of layers;
automatically depositing the material includes automatically depositing the material in a bead formation; and
each of the plurality of layers has a thickness about equal to a diameter of the bead formation.

17. The method of claim 14, wherein developing the tool path includes developing the tool path based at least in part on a shape of the void, a volume of the void, and deposition characteristics.

18. The method of claim 14, wherein:
the at least one image includes at least a first image;
the model includes a first model;
the tool path includes a first tool path; and
the method further includes:
capturing at least a second image after deposition of material;

generating a second model based on the at least a second image;

making a comparison of the second model to a desired model; and selectively developing a second tool path based on the comparison.

19. The method of claim 18, wherein the method further includes automatically removing material based on at least one of the first and second models.

* * * * *